United States Patent
Li et al.

(10) Patent No.: US 10,892,878 B2
(45) Date of Patent: Jan. 12, 2021

(54) REFERENCE SIGNAL SENDING METHOD AND APPARATUS, AND REFERENCE SIGNAL RECEIVING METHOD AND APPARATUS

(71) Applicant: HUAWEI TECHNOLOGIES CO., LTD., Guangdong (CN)

(72) Inventors: Xinxian Li, Shanghai (CN); Ning Wu, Shanghai (CN); Hao Tang, Shanghai (CN); Yi Qin, Kista (SE)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/503,577

(22) Filed: Jul. 4, 2019

(65) Prior Publication Data
US 2019/0327065 A1    Oct. 24, 2019

Related U.S. Application Data

(63) Continuation of application No. PCT/CN2017/118389, filed on Dec. 25, 2017.

(30) Foreign Application Priority Data

Jan. 6, 2017   (CN) .......................... 2017 1 0011309

(51) Int. Cl.
*H04L 12/28*   (2006.01)
*H04L 5/00*    (2006.01)
(Continued)

(52) U.S. Cl.
CPC .......... *H04L 5/0094* (2013.01); *H04L 5/0051* (2013.01); *H04L 27/2607* (2013.01); *H04W 72/0453* (2013.01)

(58) Field of Classification Search
CPC ...................................................... H04L 12/28
(Continued)

(56) References Cited

U.S. PATENT DOCUMENTS

| 2012/0002746 A1 | 1/2012 | Pham |
| 2013/0064203 A1 | 3/2013 | Ogawa |

(Continued)

FOREIGN PATENT DOCUMENTS

| CN | 102356574 A | 2/2012 |
| CN | 103166882 A | 6/2013 |

(Continued)

OTHER PUBLICATIONS

ATandT et al.,"WF on Spectrum Partitioning with Mixed Numerology",3GPP TSG RAN WG1 Meeting #87 R1-1613521,Reno, USA Nov. 14-18, 2016,total 9 pages.
(Continued)

*Primary Examiner* — Dang T Ton
(74) *Attorney, Agent, or Firm* — Womble Bond Dickinson (US) LLP

(57) ABSTRACT

A reference signal sending method and apparatus, and a reference signal receiving method and apparatus are provided. The method includes: determining, by a network device, a first configuration of a first reference signal and a second configuration of a second reference signal, where the first configuration includes a first subcarrier spacing, and the second configuration includes a second subcarrier spacing; and sending, by the network device on a first subband, the first reference signal meeting the first configuration, and sending, on a second subband, the second reference signal meeting the second configuration, where a parameter configuration of the first subband is different from a parameter configuration of the second subband.

20 Claims, 17 Drawing Sheets

(51) Int. Cl.
*H04L 27/26* (2006.01)
*H04W 72/04* (2009.01)

(58) Field of Classification Search
USPC .......................................................... 370/329
See application file for complete search history.

(56) References Cited

U.S. PATENT DOCUMENTS

| 2014/0016622 | A1 | 1/2014 | Bao et al. |
| 2015/0256308 | A1 | 9/2015 | Ma et al. |
| 2020/0112911 | A1* | 4/2020 | Ozturk ................ H04W 72/085 |

FOREIGN PATENT DOCUMENTS

| CN | 105827383 A | 8/2016 |
| CN | 106658734 A | 5/2017 |
| JP | 2014160885 A | 9/2014 |
| WO | 2016192644 A1 | 12/2016 |

OTHER PUBLICATIONS

Intel Corporation,"Discussion on CSI-RS for Class A FD-MIMO",3GPP TSG RAN WG1 Meeting #84bis R1-162367,Busan, Korea Apr. 11-15, 2016,total 5 pages.

Oppo,"Subcarrier spacing design for data and reference signal",3GPP TSG RAN WG1 Meeting #86bis R1-1608900, Lisbon, Portugal, Oct. 10-14, 2016,total 8 pages.

ATandT,"CSI-RS Design for Mixed Numerology Support in NR",3GPP TSG-RAN WG1 #87 R1-1612367, Nov. 14-18, 2016,total 8 pages.

Huawei et al,"Scenario and design criteria on flexible numerologies",3GPP TSG RAN WG1 Meeting #84bis, R1-162156,Busan, Korea, Apr. 11-15, 2016, total 7 pages.

* cited by examiner

REFERENCE SIGNAL SENDING METHOD AND APPARATUS, AND REFERENCE SIGNAL RECEIVING METHOD AND APPARATUS

CROSS-REFERENCE TO RELATED APPLICATIONS

This application is a continuation of International Application No. PCT/CN2017/118389, filed on Dec. 25, 2017, which claims priority to Chinese Patent Application No. 201710011309.4, filed on Jan. 6, 2017. The disclosures of the aforementioned applications are hereby incorporated by reference in their entireties.

TECHNICAL FIELD

This application relates to the field of communications technologies, and in particular, to a reference signal sending method and apparatus, and a reference signal receiving method and apparatus.

BACKGROUND

In a current wireless communications system, during data transmission between a network device and a terminal, because one side is unaware of channel state information, the side sends a reference signal for measuring the channel state information to the other side, and then obtains channel state quality based on a feedback. For example, in a long term evolution (LTE) system, a network device sends a reference signal such as a cell-specific reference signal (CRS) or a channel state information-reference signal (CSI-RS), and a terminal sends a reference signal such as a sounding reference signal (SRS). The terminal may determine channel state information (CSI) based on a detected CRS or CSI-RS, so as to feed back channel quality. Correspondingly, the network device may estimate uplink timing based on an SRS, and estimate downlink channel quality through channel symmetry if a downlink channel and an uplink channel are reciprocal.

In the prior art, a fixed and unique subcarrier spacing is used by a time-frequency resource for sending a reference signal. The reference signal only needs to be sent based on the fixed subcarrier spacing and a reference signal pattern. However, in a next-generation wireless communications system, for example, in a New Radio (NR) system, the system supports a plurality of subcarrier spacings, for example, 15 kHz, 30 kHz, 60 kHz, and 120 kHz. One frequency may support a plurality of subcarrier spacings, one channel may support a plurality of subcarrier spacings, and one UE may support a plurality of subcarrier spacings. A network side may dynamically or semi-statically configure locations of bandwidths corresponding to different subcarrier spacings in a system bandwidth. When a resource dynamically changes and a user supports a plurality of subcarrier spacings, measuring a signal and sending a signal in a conventional manner has difficulty in meeting a requirement, and a reference signal needs to be sent on a subband with a different subcarrier spacing from the reference signal.

In conclusion, when a plurality of subcarrier spacings are used in a system bandwidth and a location of a subband corresponding to a subcarrier spacing in the system bandwidth dynamically changes, how a network device sends a reference signal is an urgent problem to be resolved currently.

SUMMARY

Embodiments of this application provide a reference signal sending method and apparatus, and a reference signal receiving method and apparatus, to send a reference signal to a terminal when a plurality of subcarrier spacings are used in a system bandwidth and a location of a subband corresponding to a subcarrier spacing in the system bandwidth dynamically changes.

In one embodiment, a reference signal sending method is provided, including: determining, by a network device, a first configuration of a first reference signal and a second configuration of a second reference signal, where the first configuration includes a first subcarrier spacing, and the second configuration includes a second subcarrier spacing; and sending, by the network device on a first subband, the first reference signal meeting the first configuration, and sending, on a second subband, the second reference signal meeting the second configuration, where a parameter configuration of the first subband is different from a parameter configuration of the second subband.

In one embodiment, the network device sends, on the first subband, the first reference signal meeting the first configuration, and sends, on the second subband, the second reference signal meeting the second configuration. Because the parameter configuration of the first subband is different from the parameter configuration of the second subband, the method is applicable to a scenario in which a plurality of subcarrier spacings are used in a system bandwidth and a location of a subband corresponding to a subcarrier spacing in the system bandwidth dynamically changes, so that reference signal sending efficiency is improved.

In one embodiment, the parameter configuration includes one or more of the following items: a subcarrier spacing; a carrier frequency; a subband bandwidth; a location of a subband in a system bandwidth; and a cyclic prefix CP type.

In one embodiment, that the network device determines the first subcarrier spacing and the second subcarrier spacing includes: determining, by the network device, the first subcarrier spacing and the second subcarrier spacing based on a subcarrier spacing of the first subband; or determining, by the network device, the first subcarrier spacing based on a subcarrier spacing of the first subband, and determining, by the network device, the second subcarrier spacing based on a subcarrier spacing of the second subband.

In one embodiment, the first configuration further includes a first pattern of the first reference signal, or a time-frequency location and a frequency domain location of the first reference signal, and the first pattern refers to a time domain location and a frequency domain location of the first reference signal on a fixed time-frequency resource.

In one embodiment, that the network device determines the first pattern includes: determining, by the network device, a first pattern set that has a mapping relationship with the subcarrier spacing of the first subband and the first subcarrier spacing, and selecting a pattern from the first pattern set as the first pattern.

In one embodiment, the first pattern includes one or more of a zero power resource element (RE) and a non-zero power RE.

In one embodiment, the method further includes: sending, by the network device, a first switch identifier, where the first switch identifier is used to indicate whether a terminal receives the first reference signal on the first subband.

In one embodiment, the first configuration further includes a sending period of the first reference signal, and the second configuration further includes a sending period of the second reference signal.

In one embodiment, the first configuration further includes an offset of the first reference signal in one sending period, and the second configuration further includes an offset of the second reference signal in one sending period.

In one embodiment, the first configuration further includes one or more of the following items: the first subcarrier spacing; and a bandwidth occupied by the first reference signal on the first subband.

In one embodiment, frequency division multiplexing (FDM) is performed on the first subband and the second subband in the frequency domain; or time division multiplexing (TDM) is performed on the first subband and the second subband in the time domain; or FDM is performed on the first subband and the second subband in the frequency domain, and TDM is performed on the first subband and the second subband in the time domain.

In one embodiment, both the first reference signal and the second reference signal are channel state information-reference signals.

In one embodiment, a reference signal receiving method is provided, including: receiving, by a terminal on a first subband, a first reference signal meeting a first configuration, and receiving, on a second subband, a second reference signal meeting a second configuration, where the first configuration includes a first subcarrier spacing, the second configuration includes a second subcarrier spacing, and a parameter configuration of the first subband is different from a parameter configuration of the second subband; and separately feeding back, by the terminal, channel quality based on the first reference signal and the second reference signal.

In one embodiment, the parameter configuration includes one or more of the following items: a subcarrier spacing; a carrier frequency; a subband bandwidth; a location of a subband in a system bandwidth; and a cyclic prefix CP type.

In one embodiment, the first subcarrier spacing and the second subcarrier spacing are determined by using a subcarrier spacing of the first subband; or the first subcarrier spacing is determined by using a subcarrier spacing of the first subband, and the second subcarrier spacing is determined by using a subcarrier spacing of the second subband.

In one embodiment, the first configuration further includes a first pattern of the first reference signal, or a time-frequency location and a frequency domain location of the first reference signal, and the first pattern refers to a time domain location and a frequency domain location of the first reference signal on a fixed time-frequency resource.

In one embodiment, the first pattern includes one or more of a zero power resource element RE and a non-zero power RE.

In one embodiment, the method further includes: receiving, by the terminal, a first switch identifier sent by the network device; and determining, by the terminal based on the first switch identifier, whether to receive the first reference signal on the first subband.

In one embodiment, the first configuration further includes a sending period of the first reference signal, and the second configuration further includes a sending period of the second reference signal.

In one embodiment, the first configuration further includes an offset of the first reference signal in one sending period, and the second configuration further includes an offset of the second reference signal in one sending period.

A reference signal sending apparatus is provided, including: a processing unit, configured to determine a first configuration of a first reference signal and a second configuration of a second reference signal, where the first configuration includes a first subcarrier spacing, and the second configuration includes a second subcarrier spacing; and a transceiver unit, configured to: send, on a first subband, the first reference signal meeting the first configuration, and send, on a second subband, the second reference signal meeting the second configuration, where a parameter configuration of the first subband is different from a parameter configuration of the second subband.

In one embodiment, the parameter configuration includes one or more of the following items: a subcarrier spacing; a carrier frequency; a subband bandwidth; a location of a subband in a system bandwidth; and a cyclic prefix CP type.

In one embodiment, the processing unit is specifically configured to: determine the first subcarrier spacing and the second subcarrier spacing based on a subcarrier spacing of the first subband; or determine the first subcarrier spacing based on a subcarrier spacing of the first subband, and determine the second subcarrier spacing based on a subcarrier spacing of the second subband.

In one embodiment, the first configuration further includes a first pattern of the first reference signal, or a time-frequency location and a frequency domain location of the first reference signal, and the first pattern refers to a time domain location and a frequency domain location of the first reference signal on a fixed time-frequency resource.

In one embodiment, the processing unit is specifically configured to: determine a first pattern set that has a mapping relationship with the subcarrier spacing of the first subband and the first subcarrier spacing, and select a pattern from the first pattern set as the first pattern.

In one embodiment, the first pattern includes one or more of a zero power resource element RE and a non-zero power RE.

In one embodiment, the transceiver unit is further configured to: send a first switch identifier, where the first switch identifier is used to indicate whether a terminal receives the first reference signal on the first subband.

In one embodiment, the first configuration further includes a sending period of the first reference signal, and the second configuration further includes a sending period of the second reference signal.

A reference signal receiving apparatus is provided, including: a transceiver unit, configured to: receive, on a first subband, a first reference signal meeting a first configuration, and receive, on a second subband, a second reference signal meeting a second configuration, where the first configuration includes a first subcarrier spacing, the second configuration includes a second subcarrier spacing, and a parameter configuration of the first subband is different from a parameter configuration of the second subband; and a processing unit, configured to separately feed back channel quality based on the first reference signal and the second reference signal.

In one embodiment, the parameter configuration includes one or more of the following items: a subcarrier spacing; a carrier frequency; a subband bandwidth; a location of a subband in a system bandwidth; and a cyclic prefix CP type.

In one embodiment, the first subcarrier spacing and the second subcarrier spacing are determined by using a subcarrier spacing of the first subband; or the first subcarrier spacing is determined by using a subcarrier spacing of the first subband, and the second subcarrier spacing is determined by using a subcarrier spacing of the second subband.

In one embodiment, the first configuration further includes a first pattern of the first reference signal, or a time-frequency location and a frequency domain location of the first reference signal, and the first pattern refers to a time domain location and a frequency domain location of the first reference signal on a fixed time-frequency resource.

In one embodiment, the first pattern includes one or more of a zero power resource element RE and a non-zero power RE.

In one embodiment, the transceiver unit is further configured to: receive a first switch identifier sent by the network device; and determine, based on the first switch identifier, whether to receive the first reference signal on the first subband.

In one embodiment, the first configuration further includes a sending period of the first reference signal, and the second configuration further includes a sending period of the second reference signal.

A reference signal sending apparatus is provided, including: a processor, configured to determine a first configuration of a first reference signal and a second configuration of a second reference signal, where the first configuration includes a first subcarrier spacing, and the second configuration includes a second subcarrier spacing; and a transceiver, configured to: send, on a first subband, the first reference signal meeting the first configuration, and send, on a second subband, the second reference signal meeting the second configuration, where a parameter configuration of the first subband is different from a parameter configuration of the second subband.

In one embodiment, the parameter configuration includes one or more of the following items: a subcarrier spacing; a carrier frequency; a subband bandwidth; a location of a subband in a system bandwidth; and a cyclic prefix CP type.

In one embodiment, the processor is specifically configured to: determine the first subcarrier spacing and the second subcarrier spacing based on a subcarrier spacing of the first subband; or determine the first subcarrier spacing based on a subcarrier spacing of the first subband, and determine the second subcarrier spacing based on a subcarrier spacing of the second subband.

In one embodiment, the first configuration further includes a first pattern of the first reference signal, or a time-frequency location and a frequency domain location of the first reference signal, and the first pattern refers to a time domain location and a frequency domain location of the first reference signal on a fixed time-frequency resource.

In one embodiment, the processor is specifically configured to: determine a first pattern set that has a mapping relationship with the subcarrier spacing of the first subband and the first subcarrier spacing, and select a pattern from the first pattern set as the first pattern.

In one embodiment, the first pattern includes one or more of a zero power resource element RE and a non-zero power RE.

In one embodiment, the transceiver is further configured to: send a first switch identifier, where the first switch identifier is used to indicate whether a terminal receives the first reference signal on the first subband.

In one embodiment, the first configuration further includes a sending period of the first reference signal, and the second configuration further includes a sending period of the second reference signal.

A reference signal receiving apparatus is provided, including: a transceiver, configured to: receive, on a first subband, a first reference signal meeting a first configuration, and receive, on a second subband, a second reference signal meeting a second configuration, where the first configuration includes a first subcarrier spacing, the second configuration includes a second subcarrier spacing, and a parameter configuration of the first subband is different from a parameter configuration of the second subband; and a processor, configured to separately feed back channel quality based on the first reference signal and the second reference signal.

In one embodiment, the parameter configuration includes one or more of the following items: a subcarrier spacing; a carrier frequency; a subband bandwidth; a location of a subband in a system bandwidth; and a cyclic prefix CP type.

In one embodiment, the first subcarrier spacing and the second subcarrier spacing are determined by using a subcarrier spacing of the first subband; or the first subcarrier spacing is determined by using a subcarrier spacing of the first subband, and the second subcarrier spacing is determined by using a subcarrier spacing of the second subband.

In one embodiment, the first configuration further includes a first pattern of the first reference signal, or a time-frequency location and a frequency domain location of the first reference signal, and the first pattern refers to a time domain location and a frequency domain location of the first reference signal on a fixed time-frequency resource.

In one embodiment, the first pattern includes one or more of a zero power resource element RE and a non-zero power RE.

In one embodiment, the transceiver is further configured to: receive a first switch identifier sent by the network device; and determine, based on the first switch identifier, whether to receive the first reference signal on the first subband.

In one embodiment, the first configuration further includes a sending period of the first reference signal, and the second configuration further includes a sending period of the second reference signal.

DESCRIPTION OF EMBODIMENTS

Embodiments of this application may be applied to various mobile communications systems, such as an NR system, a global system for mobile communications (GSM), a code division multiple access (CDMA) system, a wideband code division multiple access (WCDMA) system, a general packet radio service (GPRS) system, a long term evolution (LTE) system, a long term evolution advanced (LTE-A) system, a universal mobile telecommunications system (UMTS), an evolved long term evolution (eLTE) system, a 5G system, and other mobile communications systems.

Figure 1:
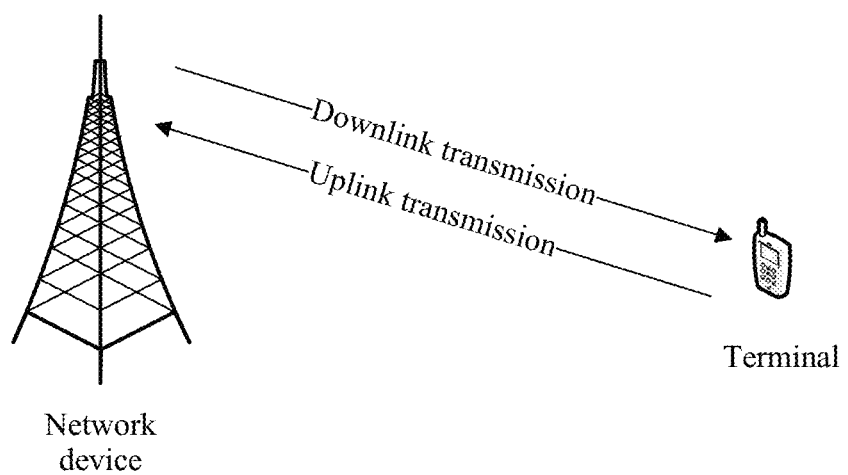
FIG. 1 is a schematic diagram of a network architecture applicable to an embodiment of this application.

FIG. 1 is a schematic diagram of a network architecture applicable to an embodiment of this application. FIG. 1 includes a network device and a terminal.

In the following, some terms in this application are described, so as to help a person skilled in the art have a better understanding.

(1) Terminal: also referred to as user equipment (UE), a device providing voice and/or data connectivity for a user, for example, a handheld device or an in-vehicle device that has a wireless connection function. For example, common terminals include a mobile phone, a tablet computer, a notebook computer, a palmtop computer, a mobile Internet device (MID), and a wearable device such as a smartwatch, a smart band, or a pedometer.

(2) Network device: a device communicating with a terminal through one or more sectors on an air interface in an access network. The base station device may further coordinate attribute management of the air interface. The network device may be a new radio (NR), gNB (gNodeB), a common base station (such as a NodeB or an eNB), an NR controller, a centralized network element (centralized unit), an NR base station, a remote radio module, a micro base station, a relay, a distributed network element (distributed unit), a transmission reception point (TRP), a transmission point (TP), or any other wireless access devices. However, the embodiments of this application are not limited thereto.

(3) Subcarrier spacing: a basic unit in the frequency domain. For example, in an LTE system, a subcarrier spacing is 15 kHz.

(4) Symbol: including but not limited to an orthogonal frequency division multiplexing (OFDM) symbol, a sparse code multiple access (SCMA) symbol, a filtered orthogonal frequency division multiplexing (F-OFDM) symbol, and a non-orthogonal multiple access (NOMA) symbol. The symbol may be specifically determined based on an actual situation, and details are not described herein.

Figure 2:
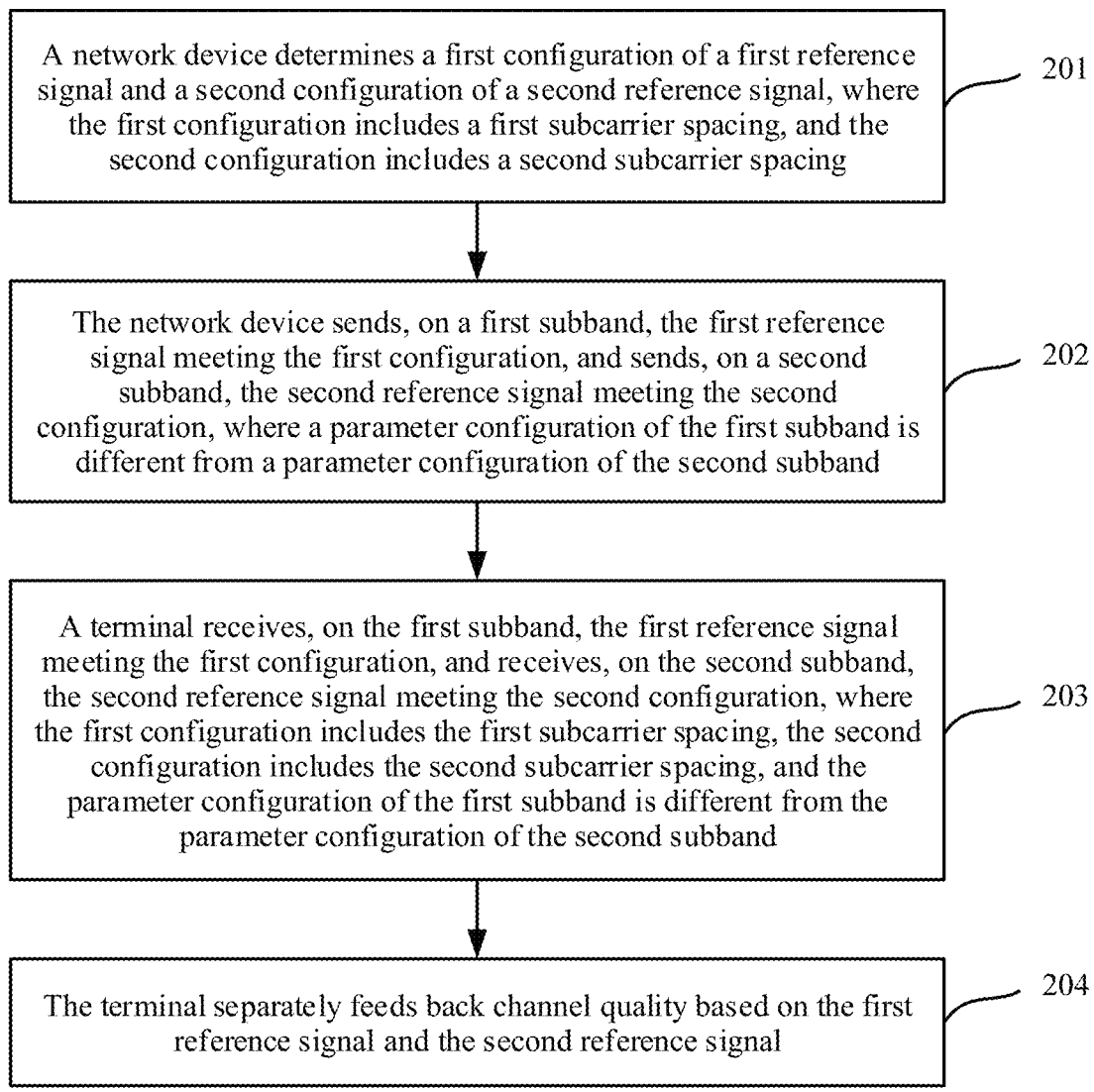
FIG. 2 is a schematic flowchart of a reference signal sending method according to an embodiment of this application.

With reference to the foregoing description, FIG. 2 is a schematic flowchart of a reference signal sending method according to an embodiment of this application.

Referring to FIG. 2, the method includes the following operations.

Operation 201: A network device determines a first configuration of a first reference signal and a second configuration of a second reference signal, where the first configuration includes a first subcarrier spacing, and the second configuration includes a second subcarrier spacing.

Operation 202: The network device sends, on a first subband, the first reference signal meeting the first configuration, and sends, on a second subband, the second reference signal meeting the second configuration, where a parameter configuration of the first subband is different from a parameter configuration of the second subband.

It should be noted that the first subcarrier may be the same as or different from a subcarrier spacing of the first subband. This is specifically determined based on an actual situation. The second subcarrier may be the same as or different from a subcarrier spacing of the second subband.

Operation 203: A terminal receives, on the first subband, the first reference signal meeting the first configuration, and receives, on the second subband, the second reference signal meeting the second configuration, where the first configuration includes the first subcarrier spacing, the second configuration includes the second subcarrier spacing, and the parameter configuration of the first subband is different from the parameter configuration of the second subband.

Operation 204: The terminal separately feeds back channel quality based on the first reference signal and the second reference signal, where the channel quality is, for example, a precoding matrix indication (PMI), a channel quality indication, a rank indication (RI), or a reference signal received power (RSRP).

In operation 201, a type of the first reference signal may be the same as or different from a type of the second reference signal. When the type of the first reference signal is the same as the type of the second reference signal, both the first reference signal and the second reference signal may be channel state information-reference signals, or both the first reference signal and the second reference signal may be reference signals similar to channel state information-reference signals or cell-specific reference signals.

In one embodiment of this application, the first configuration may further include one or more of the following items: a sending period of the first reference signal; an offset of the first reference signal in one sending period; a first pattern of the first reference signal, or a time-frequency location and a frequency domain location of the first reference signal, to be specific, a symbol index in the time domain and a carrier index in the frequency domain that are of the first reference signal in a scheduled resource block, where the first pattern refers to a time domain location and a frequency domain location of the first reference signal on a fixed time-frequency resource, the first pattern may include one or more of a zero power resource element (RE) and a non-zero power RE, and the zero power RE may be used as a guard band between different subcarriers, or may be used for power burst, to improve a transmit power of a reference signal; the first subcarrier spacing; a bandwidth occupied by the first reference signal on the first subband; and a first switch identifier, where the first switch identifier is used to indicate whether the terminal receives the first reference signal on the first subband. When the first switch identifier indicates that the terminal receives the first reference signal on the first subband, it may be indicated to the terminal that the network device sends the first reference signal periodically or sends the first reference signal in a trigger manner. Periodically sending the first reference signal means that the network device continuously sends the first reference signal based on a period and an offset until a switch is turned off, and sending the first reference signal in an activating and trigger manner means that the network device sends the first reference signal only once at each trigger.

Correspondingly, the second configuration may further include one or more of the following items: a sending period of the second reference signal; an offset of the second reference signal in one sending period; a second pattern of the second reference signal, or a time-frequency location and a frequency domain location of the second reference signal, to be specific, a symbol index in the time domain and a carrier index in the frequency domain that are of the second reference signal, where the second pattern refers to a time domain location and a frequency domain location of the second reference signal on a fixed time-frequency resource; the second subcarrier spacing; a bandwidth occupied by the second reference signal on the second subband; and a second switch identifier, where the second switch identifier is used to indicate whether the terminal receives the second reference signal on the second subband.

It should be noted that, in one embodiment of this application, the first pattern of the first reference signal and the second pattern of the second reference signal may be separately configured, or may be configured as a same pattern. The separate configuration herein means that, to distinguish between control signals and reference signals on different resource parts, different symbol indexes and frequency domain densities may be used for the reference signals sent on the different resource parts.

It should be noted that the resource part may be a resource of a part of one subband, may be a resource of one subband, or may be a resource including a plurality of subbands.

With reference to the foregoing description, the sending period of the first reference signal may be the same as or different from the sending period of the second reference signal. This is not limited in this embodiment of this application. Correspondingly, the offset of the first reference signal in one sending period may be the same as or different from the offset of the second reference signal in one sending period. The offset of the first reference signal in one sending period may be an offset between a time domain location of the first reference signal in one sending period and a start moment of the sending period. For example, one sending period includes 10 slots. If the first reference signal is sent in a sixth slot, the offset of the first reference signal in one sending period is five slots. For the offset of the second reference signal in one sending period, refer to the foregoing description.

In addition, in one embodiment of this application, the sending period and the offset may be measured by a subframe, a slot, a sub-slot, or a short transmission time interval.

The network device may determine the first subcarrier spacing and the second subcarrier spacing in a plurality of manners. In one embodiment, the first subcarrier spacing and the second subcarrier spacing may be pre-agreed by the network device and the terminal. In this case, the network device may directly determine the first subcarrier spacing and the second subcarrier spacing.

In one embodiment, the network device and the terminal may pre-agree that the first subcarrier spacing is the same as a subcarrier spacing of a physical downlink shared channel (Physical Downlink Shared Channel, PDSCH) in the first subband, and that the second subcarrier spacing is the same as a subcarrier spacing of a PDSCH in the second subband. In this case, in operation 203, the terminal may directly use the subcarrier spacing of the PDSCH in the first subband as the first subcarrier spacing, and use the subcarrier spacing of the PDSCH in the second subband as the second subcarrier spacing.

In one embodiment, the network device and the terminal may pre-agree that the first subcarrier spacing is the same as the second subcarrier spacing, and the first subcarrier spacing is the same as a subcarrier spacing of a PDSCH in the first subband. In this case, in operation 203, the terminal may directly use the subcarrier spacing of the PDSCH in the first subband as the first subcarrier spacing and the second subcarrier spacing. It should be noted that, in one embodiment of this application, the subcarrier spacing of the first subband may be the subcarrier spacing of the PDSCH in the first subband, which is referred to as the subcarrier spacing of the first subband below for ease of description. Correspondingly, the subcarrier spacing of the second subband may be the subcarrier spacing of the PDSCH in the second subband, which is referred to as the subcarrier spacing of the second subband below for ease of description.

It should be noted that, in one embodiment, the first subcarrier spacing may be the same as or different from the second subcarrier spacing. This is specifically determined based on an actual situation, and is not limited in this embodiment of this application.

For example, the first configuration further includes the first pattern, and the first pattern is pre-agreed by the network device and the terminal. The network device and the terminal may pre-agree a pattern or a pattern set. The network device sends a pattern number to the terminal device. In this case, the terminal may directly receive the first reference signal in the pre-agreed first pattern or based on a pattern corresponding to the pattern number.

In one embodiment, the network device may determine the first subcarrier spacing and the second subcarrier spacing based on the subcarrier spacing of the first subband.

Specifically, the network device may use the subcarrier spacing of the first band as the first subcarrier spacing, and use the subcarrier spacing of the first band as the second subcarrier spacing.

In one embodiment, the first subcarrier spacing is the same as the second subcarrier spacing.

In one embodiment, the network device may determine the first subcarrier spacing based on the subcarrier spacing of the first subband, and determine the second subcarrier spacing based on the subcarrier spacing of the second subband.

Specifically, the network device may use the subcarrier spacing of the first band as the first subcarrier spacing, and use the subcarrier spacing of the second band as the second subcarrier spacing. In one embodiment, the first subcarrier spacing may be the same as or different from the second subcarrier spacing.

In some embodiments, the first configuration and the second configuration may be sent by the network device to the terminal by using higher layer signaling or physical layer signaling. Specifically, the network device may send the first configuration and the second configuration on the first subband by using higher layer signaling or physical layer signaling, or may send the first configuration and the second configuration on the second subband by using higher layer signaling or physical layer signaling.

In one embodiment of this application, the higher layer signaling may be signaling such as radio resource control (RRC) signaling or Media Access Control (MAC) control element (CE) signaling. The physical layer signaling may be signaling such as downlink control information (DCI).

In this case, in operation 203, the terminal may determine the first configuration and the second configuration by using the received higher layer signaling or physical layer signaling.

It should be noted that, in one embodiment of this application, the subcarrier spacing of the first subband may be the same as or different from the subcarrier spacing of the second subband. This is not limited in this embodiment of this application.

In one embodiment of this application, the first subcarrier spacing may be the same as or different from the subcarrier spacing of the first subband. This is specifically determined based on an actual situation. Correspondingly, the second subcarrier spacing may be the same as or different from the subcarrier spacing of the second subband.

When the first subcarrier spacing is different from the subcarrier spacing of the first subband, a first pattern set may have a mapping relationship with the subcarrier spacing of the first subband and the first subcarrier spacing. The mapping relationship may be pre-agreed, or may be set by the network device and notified to the terminal. The first pattern set includes at least one pattern. In this case, when the first configuration includes the first pattern, the network device may first determine the first pattern set that has a mapping relationship with the subcarrier spacing of the first subband and the first subcarrier spacing, and select a pattern from the first pattern set as the first pattern. The second pattern may also be determined in the foregoing manner, and details are not described herein.

In operation 202, frequency division multiplexing (FDM) may be performed on the first subband and the second subband in the frequency domain. Alternatively, time division multiplexing (TDM) may be performed on the first subband and the second subband in the time domain. Alternatively, FDM is performed on the first subband and the second subband in the frequency domain, and TDM is performed on the first subband and the second subband in the time domain.

It should be noted that, in one embodiment of this application, the network device may divide one carrier into N subbands in the frequency domain, and parameter configurations of all the subbands are different, where N is a positive integer greater than or equal to 1. The network device may send a reference signal to one or more terminals on each of the N subbands, and configurations of all the sent reference signals may be the same or may be different. In addition, the network device may number a subband on each carrier.

With reference to the foregoing description, the first subband and the second subband may be on a same carrier, or may be on different carriers. For ease of description, in some of the embodiments of this application, the first subband and the second subband are on a same carrier. However, a same method may be used in a scenario in which the first subband and the second subband are on different carriers, and details are not described herein.

In addition, in one embodiment of this application, a parameter configuration of each subband may include one or more of the following items: a subcarrier spacing; a carrier frequency; a subband bandwidth; a location of a subband in a system bandwidth; a cyclic prefix (CP) type; and a subband number.

The network device may send the parameter configuration of the first subband by using higher layer signaling or physical layer signaling. Likewise, the network device may send the parameter configuration of the second subband by using higher layer signaling or physical layer signaling.

In one embodiment of this application, the network device may further send configurations of all subbands to the terminal by using a master information block (MIB) or a system information block (SIB).

In operation 204, for a specific process in which the terminal feeds back the channel quality, refer to description in an existing communications standard. Details are not described herein.

The foregoing process is described below in detail with reference to specific embodiments. In the following description, the first subband and the second subband are on a same carrier. For a case in which the first subband and the second subband are on different carriers, refer to the following description. Details are not described herein.

Figure 3:
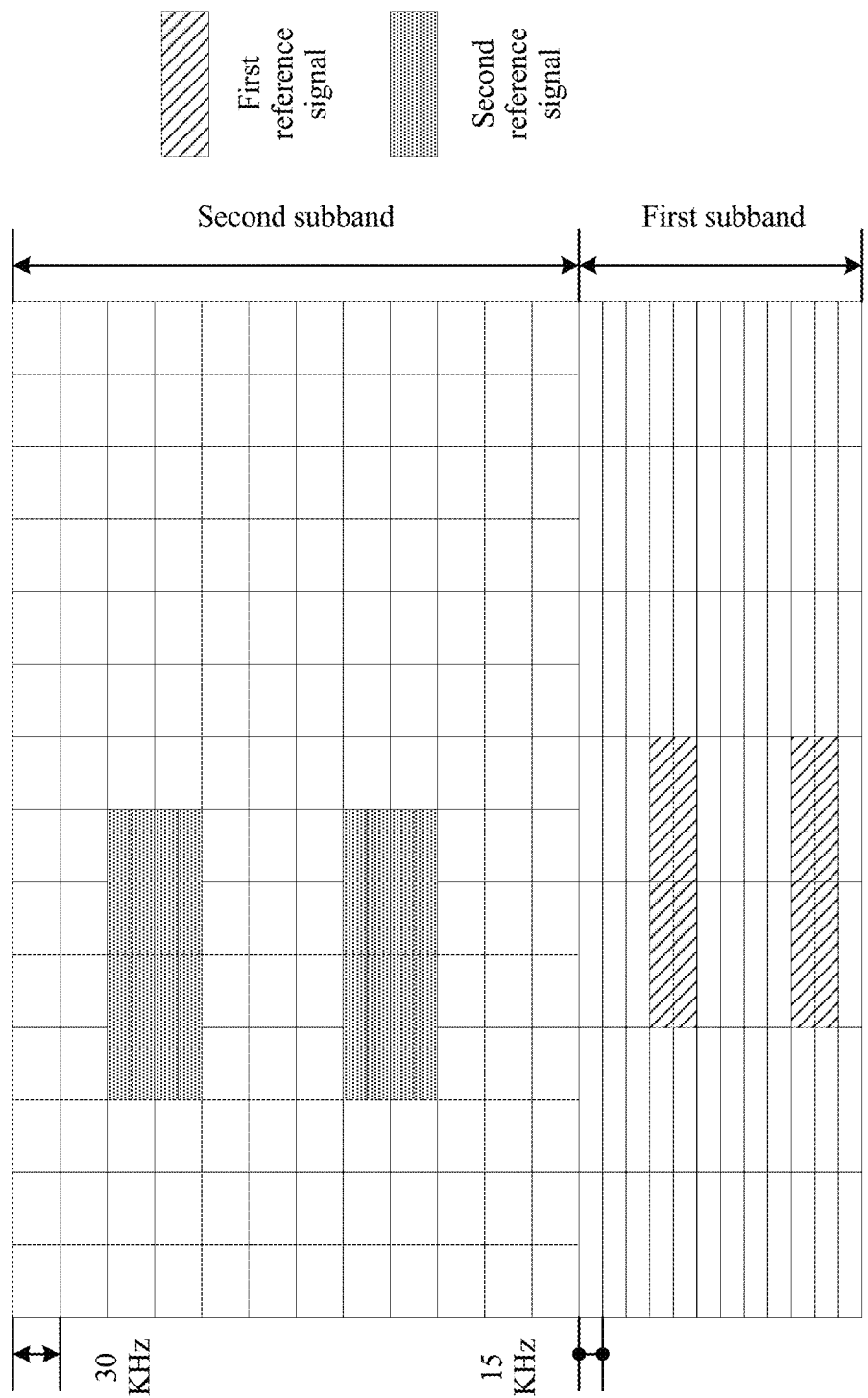
FIG. 3 is a schematic diagram of a reference signal according to an embodiment of this application.

In one embodiment, the network device sends reference signals, for example, CSI-RSs, to a terminal user on the first subband and the second subband. The subcarrier spacing of the first subband is different from the subcarrier spacing of the second subband. The subcarrier spacing of the first subband is 15 kHz, and the subcarrier spacing of the second subband is 30 kHz. The first subband and the second subband are a part of a system bandwidth, and may be a continuous bandwidth, or may include a plurality of discontinuous bandwidths. The first subcarrier spacing is the same as the second subcarrier spacing. The first subcarrier spacing and the second subcarrier spacing are determined by the network device based on the subcarrier spacing of the first subband, and are 15 kHz. FMD, TDM, or FDM and TDM may be performed on the first subband and the second subband. First reference signals, for example, CSI-RSs, with a same subcarrier spacing, namely, the first subcarrier spacing, are sent on subbands with different subcarrier spacings. For details, refer to FIG. 3. FIG. 3 is a schematic diagram of a reference signal according to an embodiment of this application.

In FIG. 3, a configuration of the first reference signal includes one or more of the following items: a pattern of a CSI-RS, a subcarrier spacing of the CSI-RS, a time domain location and a frequency domain location of the CSI-RS, a bandwidth occupied by the CSI-RS on the first band, a sending period and an offset of the CSI-RS on the first subband, and an identifier indicating whether the CSI-RS is sent on the first subband. The pattern of the CSI-RS may be a carrier index in the frequency domain and a symbol index in the time domain that are of the CSI-RS on a fixed time-frequency resource, and the fixed time-frequency resource may be a resource block, a resource block pair, or a resource block group. The time domain location and the frequency domain location of the CSI-RS may be an index of a resource block of the CSI-RS on the first subband and/or the second subband, and a time-domain symbol index and a frequency-domain carrier index that are in the resource block. For example, a time-frequency location of the CSI-RS sent by the network device is a set {resource block 0, time-domain symbol index 2, and frequency-domain carrier indexes 5 and 6}, {resource block 5, time-domain symbol index 2, and frequency-domain carrier indexes 5 and 6}, or {resource block 8, time-domain symbol index 0, and frequency-domain carrier index 7}. The resource block is defined by using the first subcarrier spacing as a granularity. A terminal side receives reference signal configuration information on the first subband, and determines the first subcarrier spacing and the time-frequency location of the first reference signal, whether a reference signal on a specific bandwidth is received, a subband corresponding to the network device, and a reference signal receiving period and an offset.

The identifier indicating whether the CSI-RS is sent on the first subband is used to indicate whether the terminal side receives the first reference signal on the subband. The identifier may indicate that the terminal side periodically receives the first reference signal, or may indicate that the terminal side receives the first reference signal in a trigger manner. For example, when the identifier indicates that the terminal side periodically receives the first reference signal, in a 1-bit resource identifier "rsflag", 1 may be used to indicate that the terminal side does not receive the first reference signal on the subband, and 0 may be used to indicate that the terminal side periodically receives the first reference signal on the subband.

Figure 4:
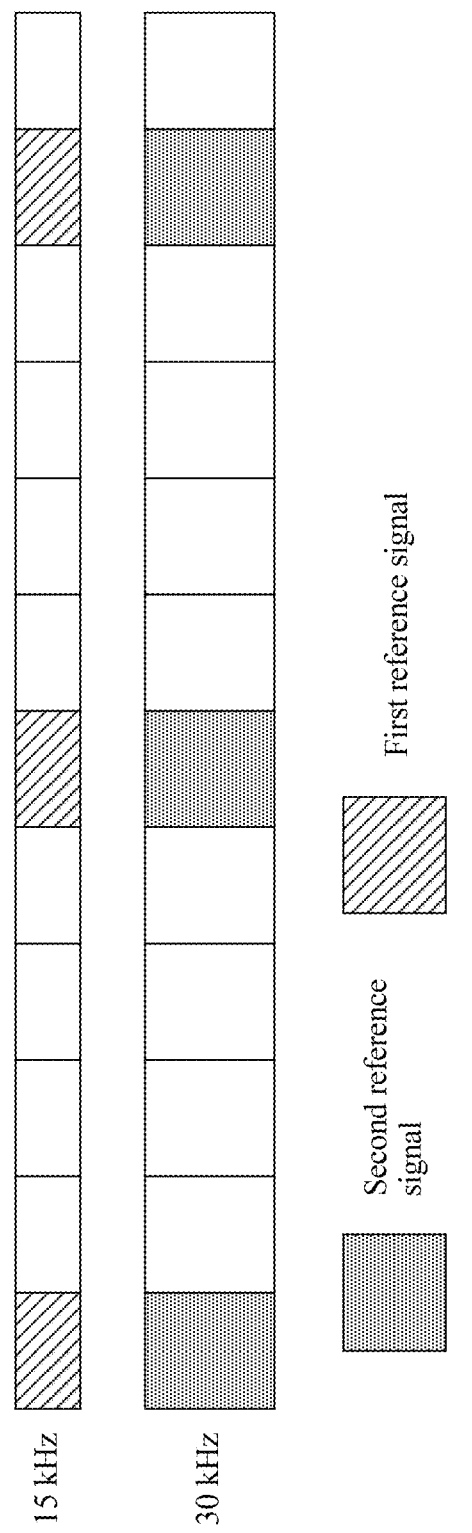
FIG. 4 is a schematic diagram of a reference signal sending period according to an embodiment of this application.

In FIG. 3, the sending period of the first reference signal may be the same as the sending period of the second reference signal, and the offset of the first reference signal in one sending period may be the same as the offset of the second reference signal in one sending period. With reference to FIG. 3, details are shown in FIG. 4. In FIG. 4, both the sending period of the first reference signal and the sending period of the second reference signal are 5, and both the offset of the first reference signal in one sending period and the offset of the second reference signal in one sending period are 0.

Figure 5:
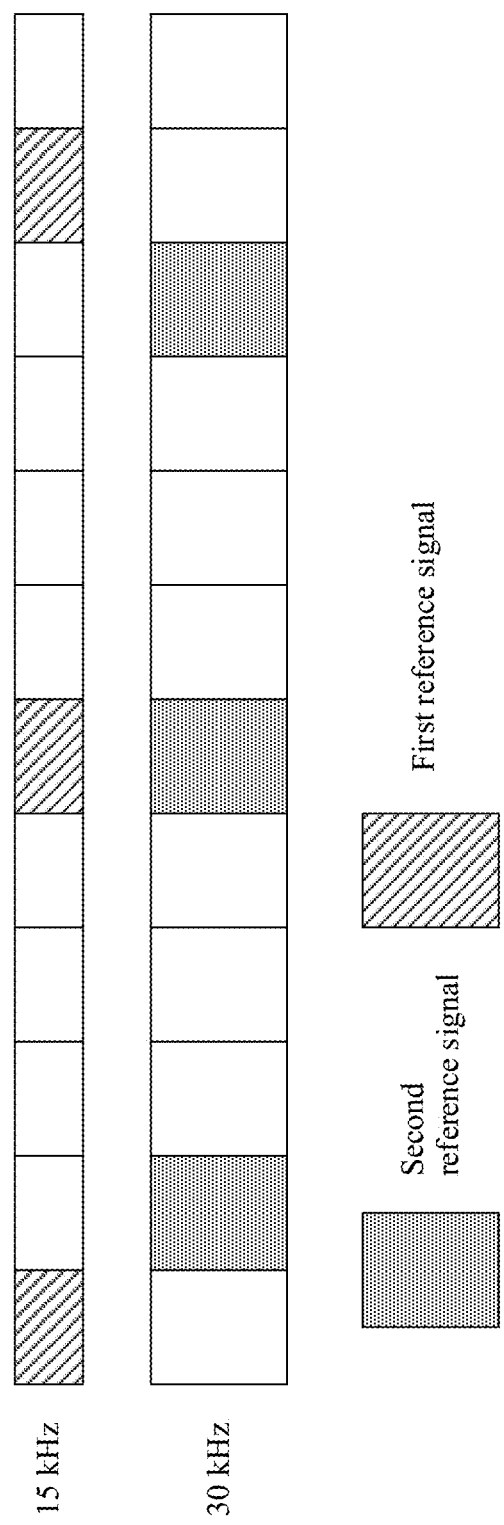
FIG. 5 is a schematic diagram of a reference signal sending period according to an embodiment of this application.

In FIG. 3, the sending period of the first reference signal may be different from the sending period of the second reference signal, and the offset of the first reference signal in one sending period may be different from the offset of the second reference signal in one sending period. With reference to FIG. 3, details are shown in FIG. 5. In FIG. 5, the sending period of the first reference signal is 5, and the offset of the first reference signal in one sending period is 0. The sending period of the second reference signal is 4, and the offset of the second reference signal in one sending period is 1.

Certainly, the foregoing is merely an example, and there are still other cases. For example, the sending period of the first reference signal is the same as the sending period of the second reference signal, and the offset of the first reference signal in one sending period is different from the offset of the second reference signal in one sending period. Details are not described herein.

It should be noted that the first subband and the second subband are merely used as an example for description. A quantity of subbands used to send the first reference signal with the first subcarrier spacing may be less than or equal to a quantity of all subbands on the system bandwidth.

In this scenario, the first subcarrier may be different from the subcarrier spacing of the first subband, and the second subcarrier may be different from the subcarrier spacing of the second subband. Details are not described herein.

Figure 6:
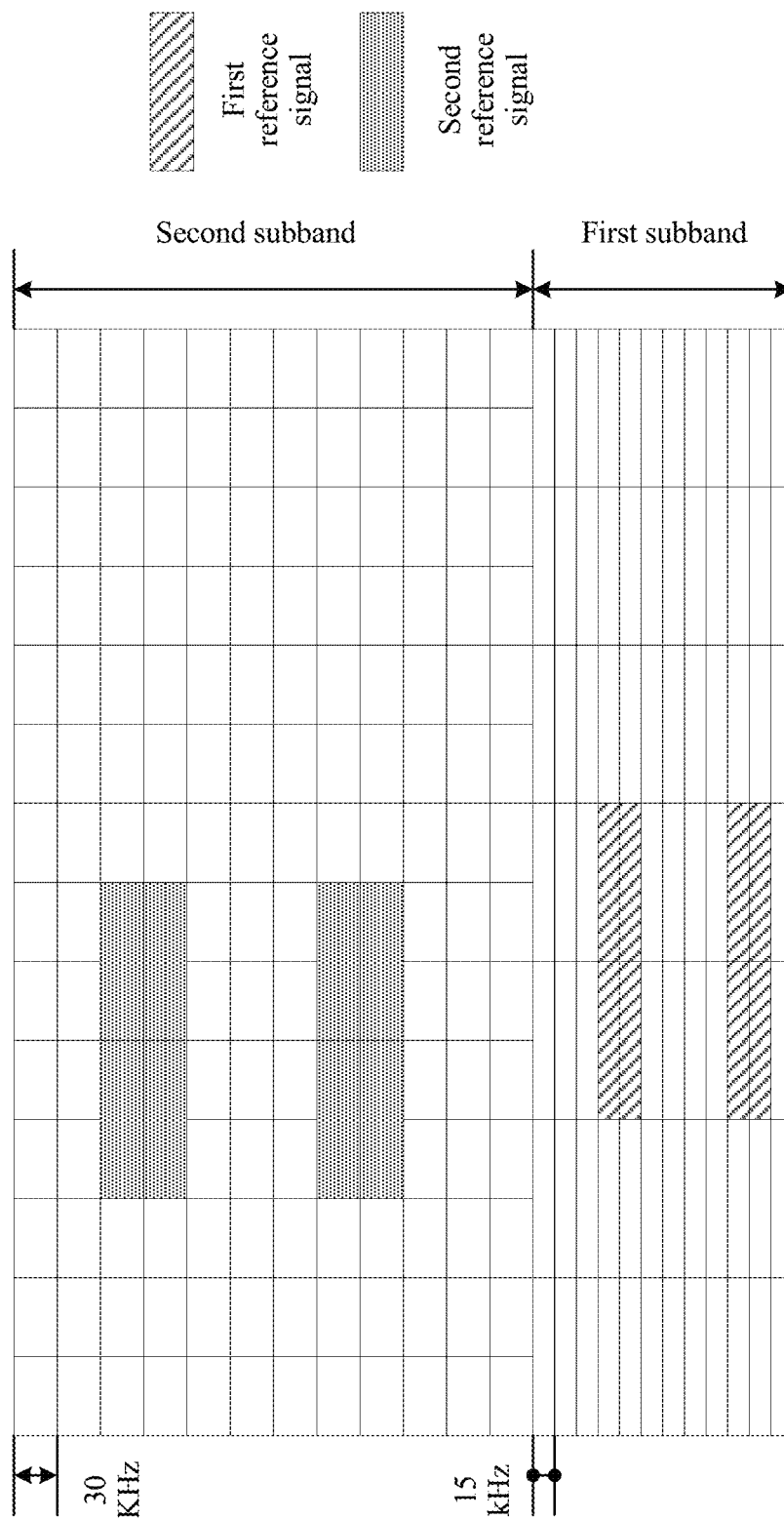
FIG. 6 is a schematic diagram of a reference signal according to an embodiment of this application.

In one embodiment, the network device sends reference signals, for example, CSI-RSs, to a terminal user on the first subband and the second subband. The subcarrier spacing of the first subband is different from the subcarrier spacing of the second subband. The subcarrier spacing of the first subband is 15 kHz, and the subcarrier spacing of the second subband is 30 kHz. The first subcarrier spacing is different from the second subcarrier spacing. The first subcarrier spacing is determined by the network device based on the subcarrier spacing of the first subband, and is 15 kHz. The second subcarrier spacing is determined by the network device based on the subcarrier spacing of the second subband, and is 30 kHz. For details, refer to FIG. 6. FIG. 6 is a schematic diagram of a reference signal according to an embodiment of this application.

In FIG. 6, a configuration of the first reference signal includes one or more of the following items: a pattern of a CSI-RS, a subcarrier spacing of the CSI-RS, a time domain location and a frequency domain location of the CSI-RS, a bandwidth occupied by the CSI-RS on the first band, a sending period and an offset of the CSI-RS on the first subband, an identifier indicating whether the CSI-RS is sent on the first subband, a subcarrier spacing of a CSI-RS subband, and a subband number. The terminal may obtain the first subcarrier spacing based on a first subcarrier spacing carried in first reference signal configuration information, or may determine the first subcarrier spacing based on the subcarrier spacing of the subband. The network device may broadcast subcarrier spacings of all subbands on the system bandwidth, and locations and bandwidths of all the subbands on the system bandwidth to a terminal side by using a MIB or a SIB. The terminal side can obtain a subcarrier spacing of a subband based on a number of the subband.

The terminal side receives configuration information of a reference signal on the first subband, and determines a first subcarrier spacing of a reference signal on each subband, a pattern of the reference signal, whether the reference signal is received, a time-frequency location of the reference signal, and a sending period and an offset.

In one embodiment, the first subcarrier may be different from the subcarrier spacing of the first subband, and the second subcarrier may be different from the subcarrier spacing of the second subband. Details are not described herein.

In one embodiment, the network device sends reference signals, for example, CSI-RSs, to a terminal on the first subband and the second subband. The first subcarrier spacing is different from the subcarrier spacing of the first subband, and the second subcarrier spacing is different from the subcarrier spacing of the second subband. The first pattern set has a mapping relationship with the subcarrier spacing of the first subband and the first subcarrier spacing, and a second pattern set has a mapping relationship with the subcarrier spacing of the second subband and the second subcarrier spacing.

Figure 7A:
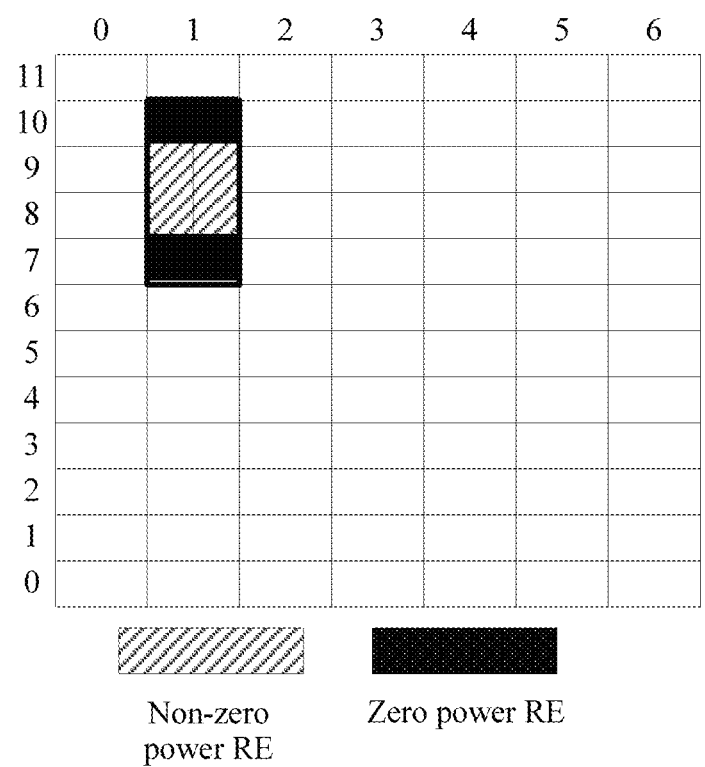
FIG. 7(a) to FIG. 7(d) are schematic diagrams of a pattern according to an embodiment of this application.

For example, when the subcarrier spacing of the first subband is 15 kHz, and the first subcarrier spacing is 30 kHz, the first pattern that has a mapping relationship with the subcarrier spacing of the first subband and the first subcarrier spacing may be shown in FIG. 7(a). In FIG. 7(a), the first pattern includes a zero power RE and a non-zero power RE.

Figure 7B:
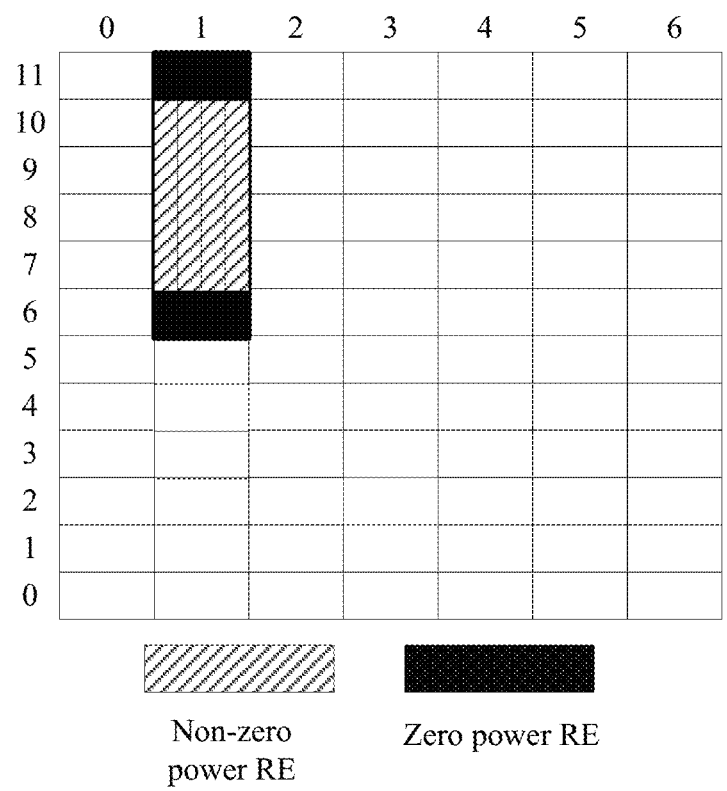

For example, when the subcarrier spacing of the first subband is 15 kHz, and the first subcarrier spacing is 60 kHz, the first pattern that has a mapping relationship with the subcarrier spacing of the first subband and the first subcarrier spacing may be shown in FIG. 7(b). In FIG. 7(b), the first pattern includes a zero power RE and a non-zero power RE.

Figure 7C:
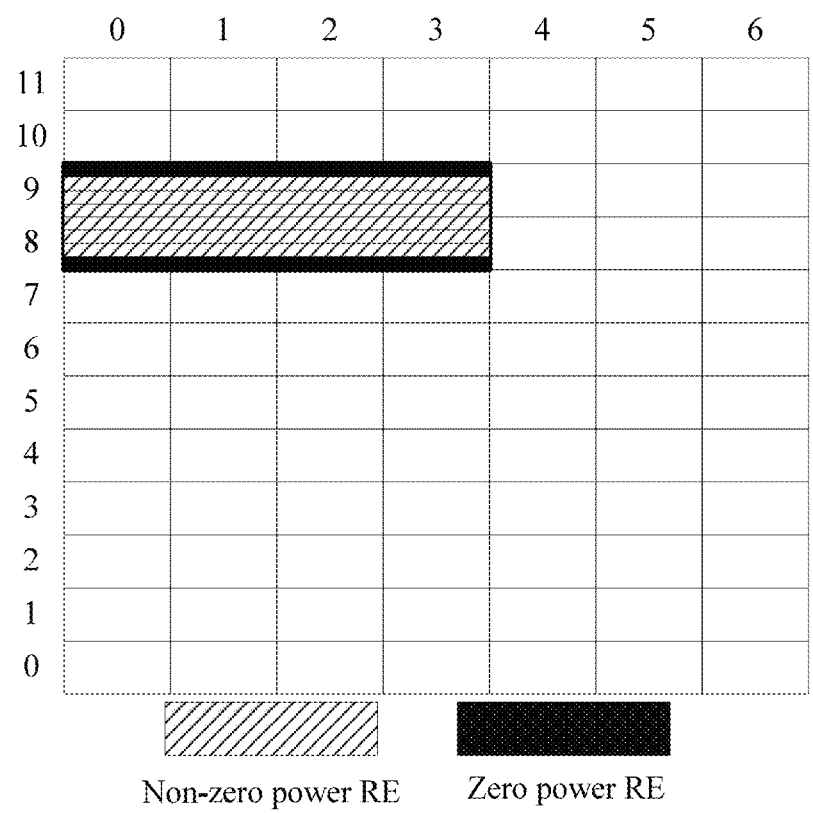

For example, when the subcarrier spacing of the first subband is 60 kHz, and the first subcarrier spacing is 15 kHz, the first pattern that has a mapping relationship with the subcarrier spacing of the first subband and the first subcarrier spacing may be shown in FIG. 7(c). In FIG. 7(c), the first pattern includes a zero power RE and a non-zero power RE.

Figure 7D:
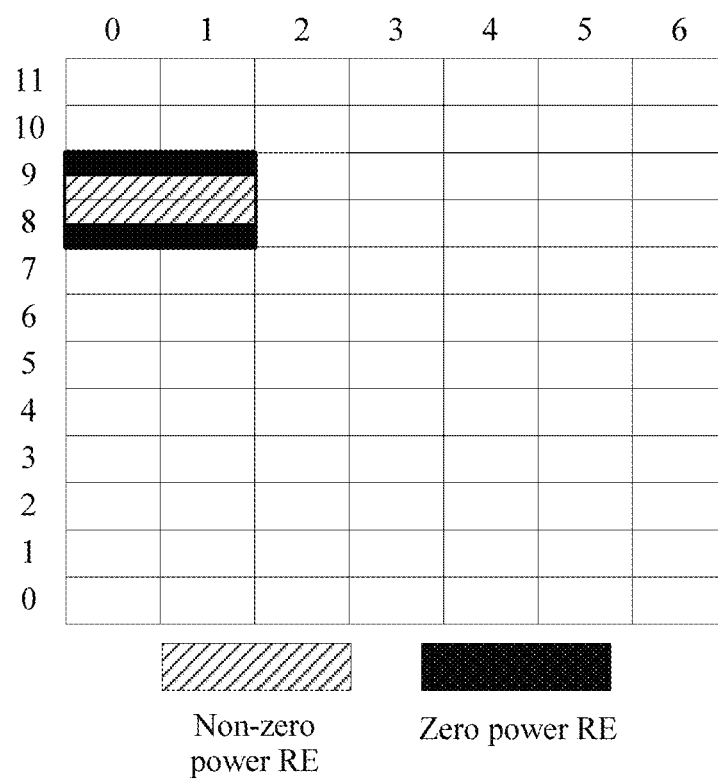

For example, when the subcarrier spacing of the first subband is 30 kHz, and the first subcarrier spacing is 15 kHz, the first pattern that has a mapping relationship with the subcarrier spacing of the first subband and the first subcarrier spacing may be shown in FIG. 7(d). In FIG. 7(d), the first pattern includes a zero power RE and a non-zero power RE.

Figure 8A:
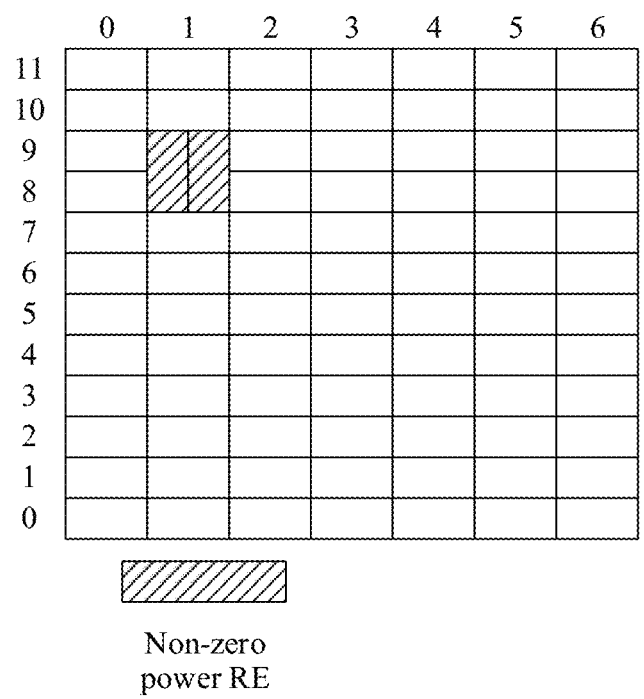
FIG. 8(a) to FIG. 8(d) are schematic diagrams of a pattern according to an embodiment of this application.
Figure 8B:
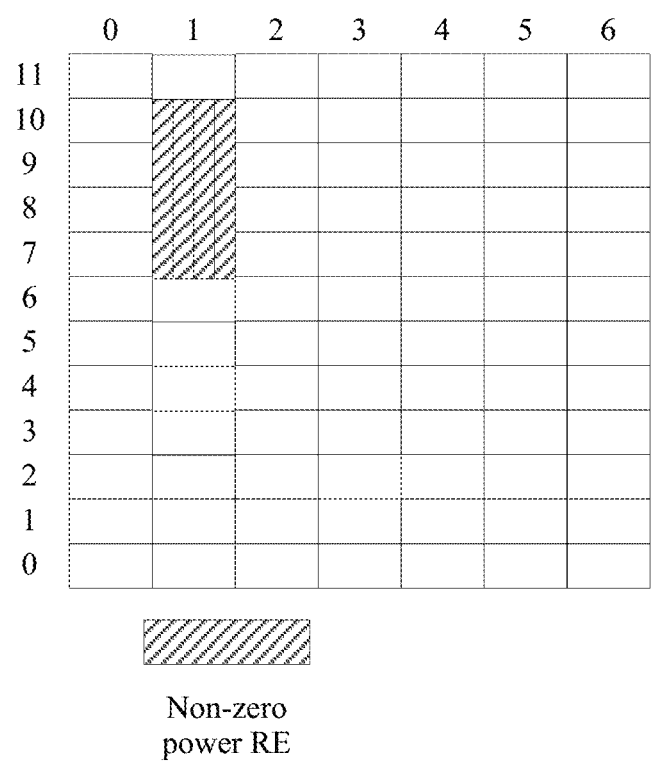
Figure 8C:
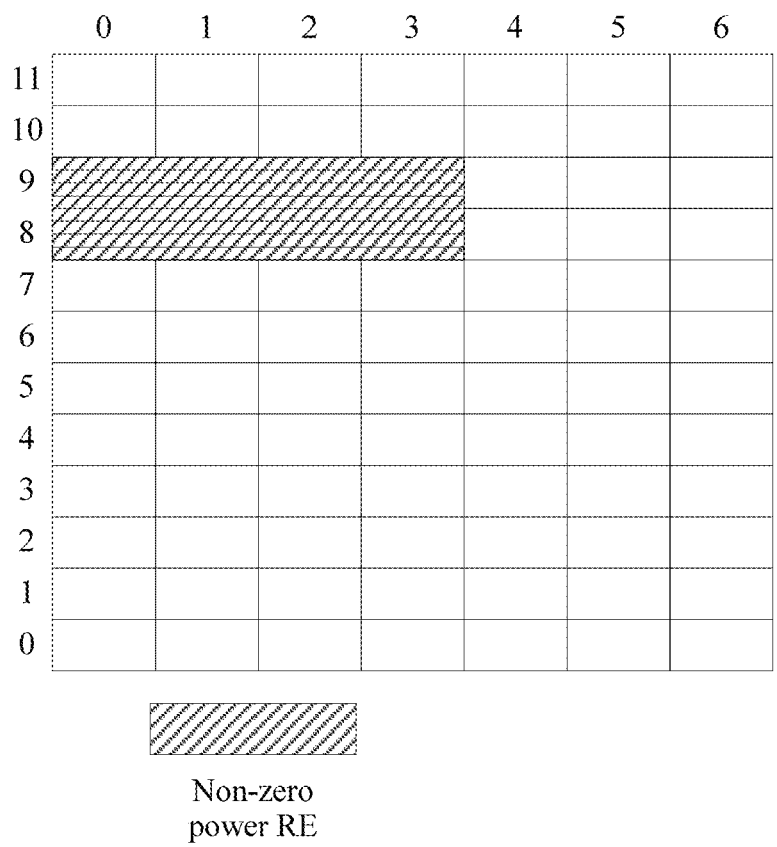
Figure 8D:
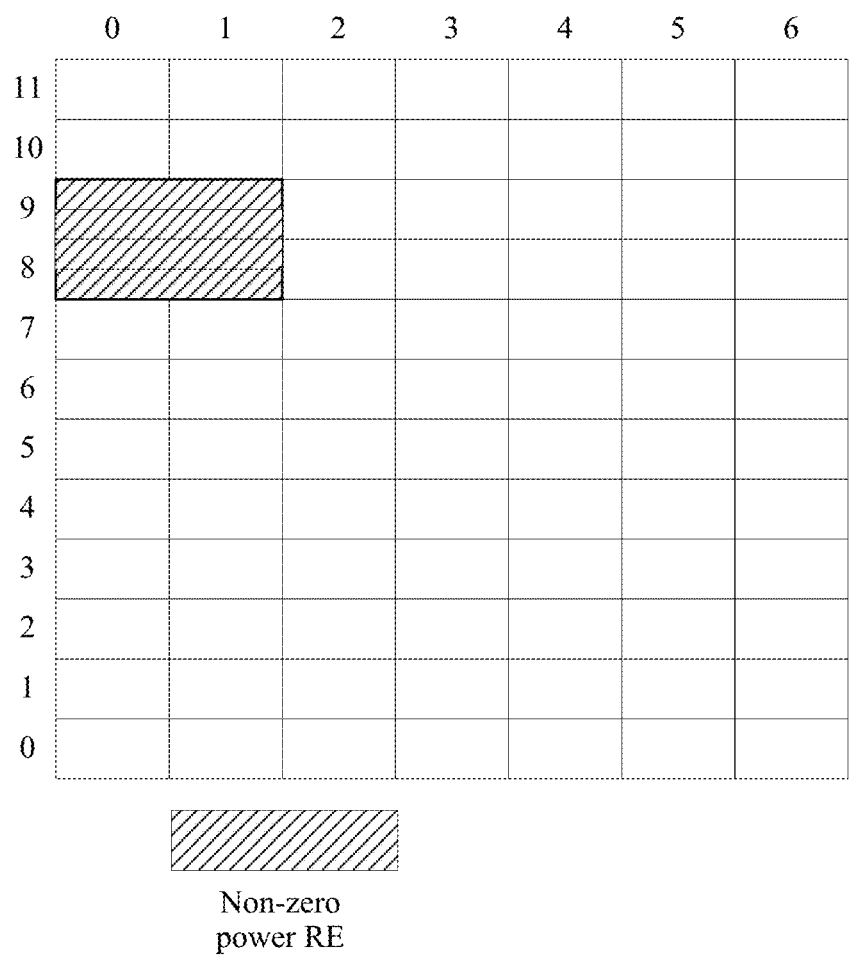

The first pattern may include only a non-zero power RE. Details are shown in FIG. 8(a) to FIG. 8(d). FIG. 8(a) to FIG. 8(d) are schematic diagrams of the first pattern that has a mapping relationship with the subcarrier spacing of the first subband and the first subcarrier spacing. In FIG. 8(a), the subcarrier spacing of the first subband is 15 kHz, and the first subcarrier spacing is 30 kHz. In FIG. 8(b), the subcarrier spacing of the first subband is 15 kHz, and the first subcarrier spacing is 60 kHz. In FIG. 8(c), the subcarrier spacing of the first subband is 60 kHz, and the first subcarrier spacing is 15 kHz. In FIG. 8(d), the subcarrier spacing of the first subband is 30 kHz, and the first subcarrier spacing is 15 kHz.

A configuration of the first reference signal includes one or more of the following items: a pattern of a CSI-RS, a subcarrier spacing of the CSI-RS, a time domain location and a frequency domain location of the CSI-RS, a bandwidth occupied by the CSI-RS on the first band, a sending period and an offset of the CSI-RS on the first subband, an identifier indicating whether the CSI-RS is sent on the first subband, a subcarrier spacing of a CSI-RS subband, and a subband number. The pattern of the CSI-RS is a pattern in the first pattern set.

A terminal side receives configuration information of a reference signal on the first subband, and determines a first subcarrier spacing of a reference signal on each subband, a pattern of the reference signal, whether the reference signal is received, a time-frequency location of the reference signal, and a sending period and an offset.

In one embodiment, the first subcarrier may be the same as the subcarrier spacing of the first subband, and the second subcarrier may be the same as the subcarrier spacing of the second subband. Details are not described herein.

These embodiments are merely examples, and there may be other possible embodiments. For details, refer to the foregoing description. Details are not described herein again.

The foregoing describes how to send a downlink reference signal. The method in the embodiments of this application is further applicable to sending an uplink reference signal. Specifically, FIG. 9 is a schematic flowchart of a reference signal sending method according to an embodiment of this application.

Figure 9:
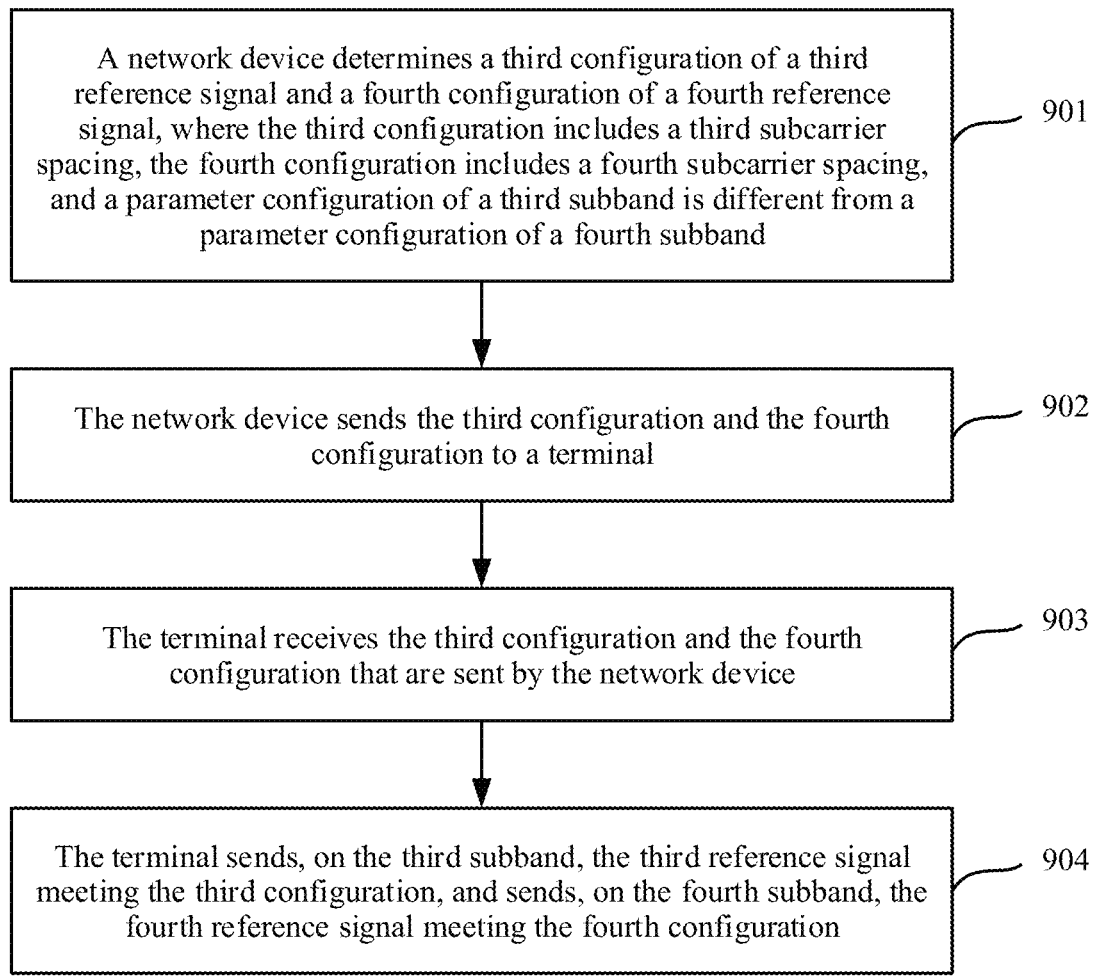
FIG. 9 is a schematic flowchart of a reference signal sending method according to an embodiment of this application.

Referring to FIG. 9, the method includes the following operations.

Operation 901: A network device determines a third configuration of a third reference signal and a fourth configuration of a fourth reference signal, where the third configuration includes a third subcarrier spacing, the fourth configuration includes a fourth subcarrier spacing, and a parameter configuration of the third subband is different from a parameter configuration of the fourth subband.

Operation 902: The network device sends the third configuration and the fourth configuration to a terminal.

Operation 903: The terminal receives the third configuration and the fourth configuration that are sent by the network device.

The third configuration includes the third subcarrier spacing, the fourth configuration includes the fourth subcarrier spacing, and the parameter configuration of the third subband is different from the parameter configuration of the fourth subband.

Operation 904: The terminal sends, on the third subband, the third reference signal meeting the third configuration, and sends, on the fourth subband, the fourth reference signal meeting the fourth configuration.

In operation 901 to operation 904, both the third reference signal and the fourth reference signal each may be channel state information-reference signals or cell-specific reference signals, or both the third reference signal and the fourth reference signal may be reference signals similar to channel state information-reference signals or cell-specific reference signals. For other content about the third reference signal and the fourth reference signal, refer to description in operation 201 to operation 204. Details are not described herein again.

In operation 901 to operation 904, the third configuration may further include one or more of the following items: a sending period of the third reference signal; an offset of the third reference signal in one sending period; a third pattern of the third reference signal, or a time-frequency location and a frequency domain location of the third reference signal, to be specific, a symbol index in the time domain and a carrier index in the frequency domain that are of the third reference signal in a scheduled resource block; a bandwidth occupied by the third reference signal on the third subband; a third switch identifier, where the third switch identifier is used to indicate whether the terminal receives the third reference signal on the third subband; and a number of the third subband.

For details of the foregoing content, refer to description of the first configuration or the second configuration in operation 201 to operation 204. Details are not described herein again.

Correspondingly, for specific content of the fourth configuration, refer to description of the third configuration and description of the first configuration or the second configuration in operation 201 to operation 204. Details are not described herein again.

In operation 901 to operation 904, for specific content of the parameter configuration of the third subband and the parameter configuration of the fourth subband, refer to description in operation 201 to operation 204. Details are not described herein again.

In operation 901 to operation 904, the third subcarrier spacing may be the same as or different from the fourth subcarrier spacing. For details, refer to description of the first subcarrier spacing and the second subcarrier spacing in operation 201 to operation 204. Details are not described herein again.

In operation 901 to operation 904, the third subband and the fourth subband may be located on a same carrier, or may be located on different carriers. For details, refer to description in operation 201 to operation 204. Details are not described herein again.

Based on a same technical concept, an embodiment of this application further provides a reference signal sending apparatus, and the apparatus can perform the foregoing method embodiment.

Figure 10:
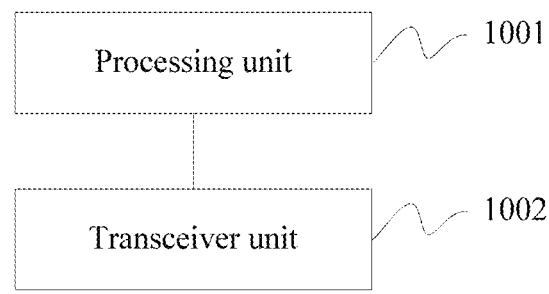
FIG. 10 is a schematic structural diagram of a reference signal sending apparatus according to an embodiment of this application.

FIG. 10 is a schematic structural diagram of a reference signal sending apparatus according to an embodiment of this application.

Referring to FIG. 10, the apparatus includes: a processing unit 1001, configured to determine a first configuration of a first reference signal and a second configuration of a second reference signal, where the first configuration includes a first subcarrier spacing, and the second configuration includes a second subcarrier spacing; and a transceiver unit 1002, configured to: send, on a first subband, the first reference signal meeting the first configuration, and send, on a second subband, the second reference signal meeting the second configuration, where a parameter configuration of the first subband is different from a parameter configuration of the second subband.

In one embodiment, the parameter configuration includes one or more of the following items: a subcarrier spacing; a carrier frequency; a subband bandwidth; a location of a subband in a system bandwidth; and a cyclic prefix CP type.

In one embodiment, the processing unit 1001 is specifically configured to: determine the first subcarrier spacing and the second subcarrier spacing based on a subcarrier spacing of the first subband; or determine the first subcarrier spacing based on a subcarrier spacing of the first subband, and determine the second subcarrier spacing based on a subcarrier spacing of the second subband.

In one embodiment, the first configuration further includes a first pattern of the first reference signal, or a time-frequency location and a frequency domain location of the first reference signal, and the first pattern refers to a time domain location and a frequency domain location of the first reference signal on a fixed time-frequency resource.

In one embodiment, the processing unit 1001 is specifically configured to determine a first pattern set that has a mapping relationship with the subcarrier spacing of the first subband and the first subcarrier spacing, and select a pattern from the first pattern set as the first pattern.

In one embodiment, the first pattern includes one or more of a zero power resource element RE and a non-zero power RE.

In one embodiment, the transceiver unit 1002 is further configured to send a first switch identifier, where the first switch identifier is used to indicate whether a terminal receives the first reference signal on the first subband.

In one embodiment, the first configuration further includes a sending period of the first reference signal, and the second configuration further includes a sending period of the second reference signal.

Figure 11:
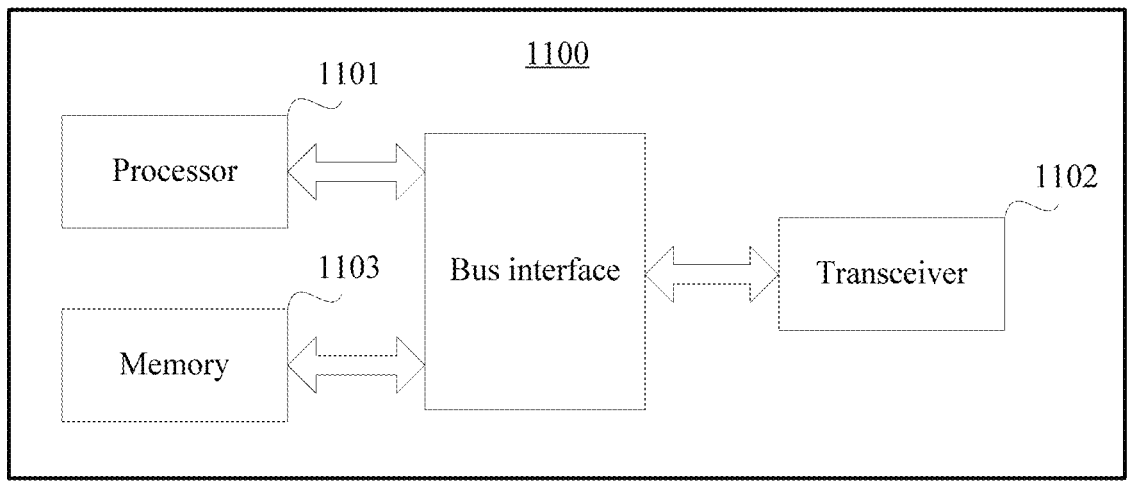
FIG. 11 is a schematic structural diagram of a network device according to an embodiment of this application.

It should be understood that division of the foregoing units is merely logical function division. In actual implementation, all or some of the units may be integrated into one physical entity, or the units may be physically separated. In one embodiment of this application, the transceiver unit 1002 may be implemented by a transceiver, and the processing unit 1001 may be implemented by a processor. As shown in FIG. 11, a network device 1100 may include a processor 1101, a transceiver 1102, and a memory 1103. The memory 1103 may be configured to store a program/code that is pre-installed when the network device 1100 is delivered from a factory, or may store code or the like executed by the processor 1101.

Based on a same technical concept, an embodiment of this application further provides a reference signal receiving apparatus, and the apparatus can perform the foregoing method embodiment.

Figure 12:
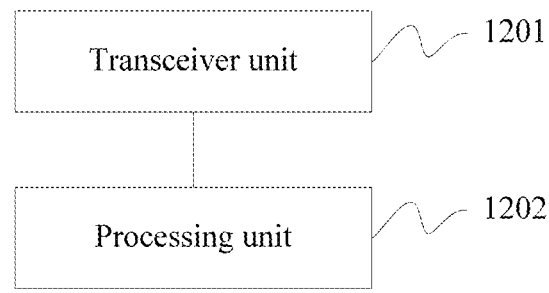
FIG. 12 is a schematic structural diagram of a reference signal sending apparatus according to an embodiment of this application.

FIG. 12 is a schematic structural diagram of a reference signal receiving apparatus according to an embodiment of this application.

Referring to FIG. 12, the apparatus includes: a transceiver unit 1201, configured to: receive, on a first subband, a first reference signal meeting a first configuration, and receive, on a second subband, a second reference signal meeting a second configuration, where the first configuration includes a first subcarrier spacing, the second configuration includes a second subcarrier spacing, and a parameter configuration of the first subband is different from a parameter configuration of the second subband; and a processing unit 1202, configured to separately feed back channel quality based on the first reference signal and the second reference signal.

In one embodiment, the parameter configuration includes one or more of the following items: a subcarrier spacing; a carrier frequency; a subband bandwidth; a location of a subband in a system bandwidth; and a cyclic prefix CP type.

In one embodiment, the first subcarrier spacing and the second subcarrier spacing are determined by using a subcarrier spacing of the first subband; or the first subcarrier spacing is determined by using a subcarrier spacing of the first subband, and the second subcarrier spacing is determined by using a subcarrier spacing of the second subband.

In one embodiment, the first configuration further includes a first pattern of the first reference signal, or a time-frequency location and a frequency domain location of the first reference signal, and the first pattern refers to a time domain location and a frequency domain location of the first reference signal on a fixed time-frequency resource.

In one embodiment, the first pattern includes one or more of a zero power resource element RE and a non-zero power RE.

In one embodiment, the transceiver unit 1201 is further configured to: receive a first switch identifier sent by the network device; and determine, based on the first switch identifier, whether to receive the first reference signal on the first subband.

In one embodiment, the first configuration further includes a sending period of the first reference signal, and the second configuration further includes a sending period of the second reference signal.

Figure 13:
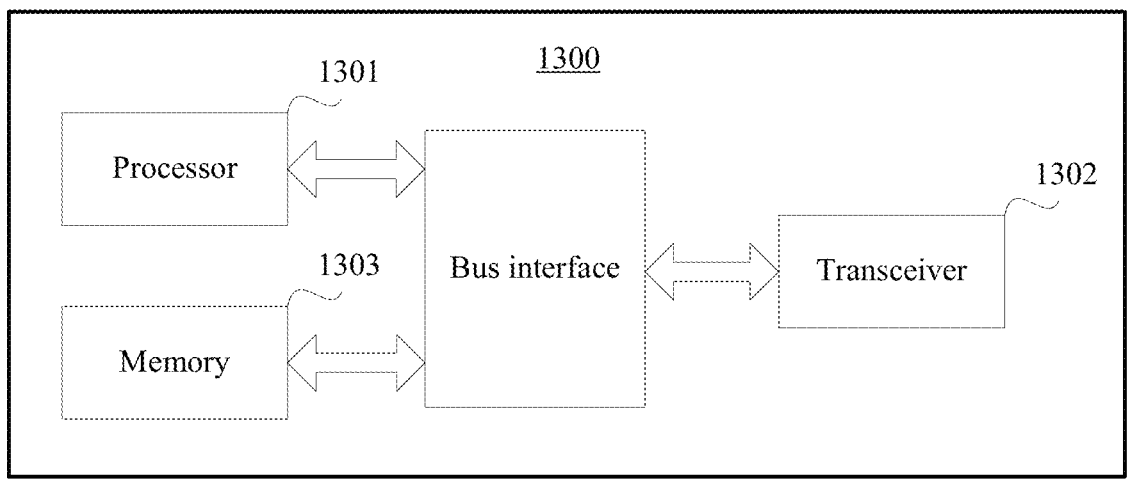
FIG. 13 is a schematic structural diagram of a terminal according to an embodiment of this application.

It should be understood that division of the foregoing units is merely logical function division. In actual implementation, all or some of the units may be integrated into one physical entity, or the units may be physically separated. In one embodiment of this application, the transceiver unit 1201 may be implemented by a transceiver, and the processing unit 1202 may be implemented by a processor. As shown in FIG. 13, a terminal 1300 may include a processor 1301, a transceiver 1302, and a memory 1303. The memory 1303 may be configured to store a program/code that is pre-installed when the terminal 1300 is delivered from a factory, or may store code or the like executed by the processor 1301.

The transceiver may be a wired transceiver, a wireless transceiver, or a combination thereof. For example, the wired transceiver may be an Ethernet interface. The Ethernet interface may be an optical interface, an electrical interface, or a combination thereof. For example, the wireless transceiver may be a wireless local area network transceiver, a cellular network transceiver, or a combination thereof. The processor may be a central processing unit (CPU), a network processor (NP), or a combination of a CPU and an NP. The processor 1501 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The memory may include a volatile memory, for example, a random access memory (RAM), or the memory may include a non-volatile memory, for example, a read-only memory (ROM), a flash memory, a hard disk drive (HDD), or a solid-state drive (SSD). Alternatively, the memory may include a combination of the foregoing types of memories.

A bus interface may be further included in FIG. 11 and FIG. 13. The bus interface may include any quantity of interconnecting buses and bridges, and may specifically link together various circuits of one or more processors represented by the processor and one or more memories represented by the memory. The bus interface may further link together various other circuits, such as a peripheral device, a voltage regulator, and a power management circuit. This is well known in the art, and therefore is not further described in this specification. The bus interface provides an interface.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

A person skilled in the art can make various modifications and variations to this application without departing from the scope of this application. This application is intended to cover these modifications and variations provided that they fall within the scope of protection defined by the following claims.

What is claimed is:

1. A reference signal receiving method, comprising:
   receiving, by a terminal on a first subband, a first reference signal meeting a first configuration, and receiving, on a second subband, a second reference signal meeting a second configuration, wherein the first configuration comprises a first subcarrier spacing, the second configuration comprises a second subcarrier spacing, and a parameter configuration of the first subband is different from a parameter configuration of the second subband; and
   separately feeding back, by the terminal, channel quality based on the first reference signal and the second reference signal.

2. The method according to claim 1, wherein the parameter configuration comprises one or more of:
   a subcarrier spacing;
   a carrier frequency;
   a subband bandwidth;
   a location of a subband in a system bandwidth; and
   a cyclic prefix (CP) type.

3. The method according to claim 1, wherein the first subcarrier spacing and the second subcarrier spacing are determined by using a subcarrier spacing of the first subband; or
   the first subcarrier spacing is determined by using a subcarrier spacing of the first subband, and the second subcarrier spacing is determined by using a subcarrier spacing of the second subband.

4. The method according to claim 1, wherein the first configuration further comprises a first pattern of the first reference signal, or a time-frequency location and a frequency domain location of the first reference signal, and the first pattern refers to a time domain location and a frequency domain location of the first reference signal on a fixed time-frequency resource.

5. The method according to claim 4, wherein the first pattern comprises one or more of a zero power resource element RE and a non-zero power RE.

6. The method according to claim 1, wherein the method further comprises:
   receiving, by the terminal, a first switch identifier sent by the network device; and
   determining, by the terminal based on the first switch identifier, whether to receive the first reference signal on the first subband.

7. The method according to claim 1, wherein the first configuration further comprises a sending period of the first reference signal, and the second configuration further comprises a sending period of the second reference signal.

8. A reference signal sending apparatus, comprising:
   a processing unit, configured to determine a first configuration of a first reference signal and a second configuration of a second reference signal, wherein the first configuration comprises a first subcarrier spacing, and the second configuration comprises a second subcarrier spacing; and
   a transceiver unit, configured to: send, on a first subband, the first reference signal meeting the first configuration, and send, on a second subband, the second reference signal meeting the second configuration, wherein
   a parameter configuration of the first subband is different from a parameter configuration of the second subband.

9. The apparatus according to claim 8, wherein the parameter configuration comprises one or more of:
   a subcarrier spacing;
   a carrier frequency;
   a subband bandwidth;
   a location of a subband in a system bandwidth; and
   a cyclic prefix (CP) type.

10. The apparatus according to claim 8, wherein the processing unit is configured to:
    determine the first subcarrier spacing and the second subcarrier spacing based on a subcarrier spacing of the first subband; or
    determine the first subcarrier spacing based on a subcarrier spacing of the first subband, and determine the second subcarrier spacing based on a subcarrier spacing of the second subband.

11. The apparatus according to claim 8, wherein the first configuration further comprises a first pattern of the first reference signal, or a time-frequency location and a frequency domain location of the first reference signal, and the first pattern refers to a time domain location and a frequency domain location of the first reference signal on a fixed time-frequency resource.

12. The apparatus according to claim 11, wherein the processing unit is configured to:
    determine a first pattern set that has a mapping relationship with the subcarrier spacing of the first subband and the first subcarrier spacing, and select a pattern from the first pattern set as the first pattern.

13. The apparatus according to claim 11, wherein the first pattern comprises one or more of a zero power resource element RE and a non-zero power RE.

14. A reference signal receiving apparatus, comprising:
    a transceiver unit, configured to: receive, on a first subband, a first reference signal meeting a first configuration, and receive, on a second subband, a second reference signal meeting a second configuration, wherein the first configuration comprises a first subcarrier spacing, the second configuration comprises a second subcarrier spacing, and a parameter configuration of the first subband is different from a parameter configuration of the second subband; and
    a processing unit, configured to separately feed back channel quality based on the first reference signal and the second reference signal.

15. The apparatus according to claim 14, wherein the parameter configuration comprises one or more of:
  a subcarrier spacing;
  a carrier frequency;
  a subband bandwidth;
  a location of a subband in a system bandwidth; and
  a cyclic prefix (CP) type.

16. The apparatus according to claim 14, wherein the first subcarrier spacing and the second subcarrier spacing are determined by using a subcarrier spacing of the first subband; or
  the first subcarrier spacing is determined by using a subcarrier spacing of the first subband, and the second subcarrier spacing is determined by using a subcarrier spacing of the second subband.

17. The apparatus according to claim 14, wherein the first configuration further comprises a first pattern of the first reference signal, or a time-frequency location and a frequency domain location of the first reference signal, and the first pattern refers to a time domain location and a frequency domain location of the first reference signal on a fixed time-frequency resource.

18. The apparatus according to claim 17, wherein the first pattern comprises one or more of a zero power resource element RE and a non-zero power RE.

19. The apparatus according to claim 14, wherein the transceiver unit is further configured to:
  receive a first switch identifier sent by the network device; and
  determine, based on the first switch identifier, whether to receive the first reference signal on the first subband.

20. The apparatus according to claim 14, wherein the first configuration further comprises a sending period of the first reference signal, and the second configuration further comprises a sending period of the second reference signal.

* * * * *